March 13, 1962    M. AVEN    3,025,243

WHITE ELECTROLUMINESCENT PHOSPHOR

Filed Dec. 2, 1959

Inventor:
Manuel Aven
by Ernest W. Hignee
His Attorney

United States Patent Office 3,025,243
Patented Mar. 13, 1962

3,025,243
WHITE ELECTROLUMINESCENT PHOSPHOR
Manuel Aven, Ballston Lake, N.Y., assignor to General Electric Company, a corporation of New York
Filed Dec. 2, 1959, Ser. No. 856,693
7 Claims. (Cl. 252—301.6)

This invention relates to luminescent materials or phosphors and more particularly to an electroluminescent zinc sulfide type phosphor providing white light under electric field excitation.

Electroluminescent phosphors may be used in electroluminescent lamps or cells wherein a thin layer of phosphor dispersed in a suitable dielectric medium is sandwiched between a pair of conducting plates at least one of which is transparent. The lamp is in the nature of a luminous capacitor and when an alternating voltage is applied across the plates, the phosphor emits visible light which escapes through the transparent plate.

It is well-known that zinc sulfide phosphors can be made with electroluminescent emission in the blue, in the green, in the yellow, and in the orange through emission peaks occurring at about 4600, 5200, 5850 and 6800 A. respectively. In many of the applications for electroluminescent lamps, white light is preferable to colored light. It is possible to combine the known colored electroluminescent phosphors in various proportions and thereby obtain white emitting mixtures with reasonably good appearance. For example, an electroluminescent phosphor blend may be prepared by mixing blue, green, and yellow emitting phosphors in proportions of approximately 25:5:70, and electroluminescent lamps using this phosphor blend give a light which appears white to the eye. Unfortunately, however, the three components tend to depreciate at different rates during life as a result of which the electroluminescent lamps change color with use; this one particular blend shows a tendency to turn pink. A single component white electroluminescent phosphor, and particularly one which is relatively easy to prepare and which is stable in color during life would obviously be much preferable.

Accordingly the general object of the invention is to provide a single component electroluminescent phosphor giving a light emission which appears white to the eye.

More specific objects of the invention are to provide such phosphors having relatively good brightness and maintenance and which remain stable in color throughout life, and to provide methods for preparing the phosphors.

In accordance with the invention, I provide a single component white electroluminescent phosphor of the zinc sulfide type combining in suitable proportions high copper blue emitting centers (believed to result from two atoms of aluminum-coactivated substitutional copper), low copper green emitting centers (believed to result from one atom of aluminum-coactivated substitutional copper), and yellow emitting centers resulting from one atom of substitutional manganese. The coactivator is aluminum and the phosphor is fired in hydrogen sulfide. Where firing is in moist hydrogen sulfide, coactivation is substantially entirely due to aluminum. Where firing is in dry hydrogen sulfide, some orange self-coactivated copper centers are formed in addition to the above-mentioned blue, green and yellow luminescence centers. As a result, to achieve white emission the proportion of manganese required is reduced, in general to about ⅕ that required with moist hydrogen sulfide.

Figure 1:
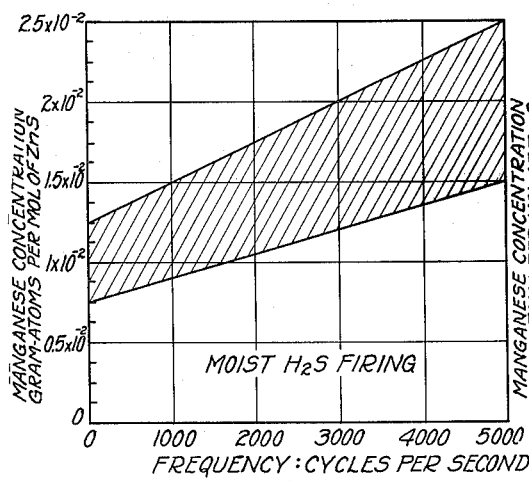
FIG. 1 illustrates graphically the manganese concentration to frequency relationship in moist hydrogen sulfide fired phosphors according to the invention.

A typical phosphor in accordance with the invention may be prepared as follows: a mixture of zinc sulfide is slurried with an aqueous solution of copper, aluminum and manganese salts to give $8 \times 10^{-4}$ to $8 \times 10^{-3}$, preferably about $2.5 \times 10^{-3}$ gram atoms of copper, $3.2 \times 10^{-5}$ to $3.2 \times 10^{-4}$, preferably about $1 \times 10^{-4}$ gram atoms of aluminum, and $1 \times 10^{-2}$ to $2 \times 10^{-2}$ gram atoms of manganese per mol of zinc sulfide for wet $H_2S$ firing, and about ⅕ as much for dry $H_2S$ firing. Heat decomposable salts of copper, aluminum and manganese are used, the most convenient being the nitrates. The lower concentration of manganese is suitable for producing white in the lower frequencies when firing is done with wet hydrogen sulfide. The higher concentration of manganese is suitable for producing white at the higher frequencies when firing is done in wet hydrogen sulfide. When firing is done in dry hydrogen sulfide, the concentration of manganese must be decreased about five fold. The concentration of manganese is quite critical and will be discussed more fully hereinafter.

The slurry is dried at a low temperature and transferred to a bottle-shaped silica firing vessel. A thin quartz tube is inserted to extend all the way into the bottle-shaped firing vessel and hydrogen sulfide is passed through it into the firing vessel. The hydrogen sulfide thus passes over the phosphor and is ignited as it emerges from the mouth of the firing vessel. The firing vessel, with hydrogen sulfide passing through it, is then inserted into a furnace, preheated to a temperature in the range of 1000 to 1200° C., preferably about 1100° C., and kept there for at least one hour. The reaction time is not critical provided it is sufficient to allow the reaction to go to completion and equilibrium to be reached. After this period, the firing vessel is withdrawn and let cool to room temperature without any forced cooling.

After the phosphor has cooled, it is removed from the firing vessel, screened, and washed with an aqueous solution of sodium cyanide to remove excess surface copper sulfide. After rinsing with copious amounts of distilled water, the phosphor is dried and screened once more and is then ready for use.

The concentration of manganese in the phosphor is important and determines the color rendition. If manganese is omitted entirely, a bluish-green emitting phosphor is obtained. Adding increasing amounts of manganese up to about 5 atom percent per mol of zinc sulfide produces a gradual shift through various shades of white to yellow. A given percentage of manganese will result in white emission at one frequency only. For a given concentration of manganese resulting in white light at a given frequency, a shift to lower operating frequencies results in a color shift to yellow, and a shift to higher operating frequencies results in a color shift to blue. It is, however, possible to produce a white emitting phosphor for operation at any given frequency by reducing the concentration of manganese for low frequency operation and increasing it for high frequency operation.

Figure 2:
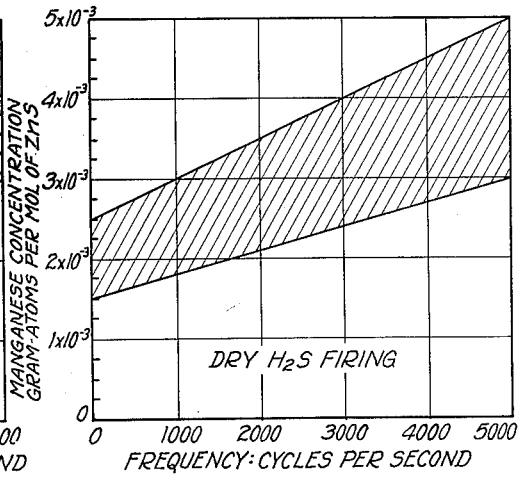
FIG. 2 illustrates the same relationship in dry hydrogen sulfide fired phosphors.

In general, where firing is in wet or moist $H_2S$, a manganese concentration of about $1 \times 10^{-2}$ gram atom per mol of zinc sulfide will result in white light at low operating frequencies, that is frequencies in the nature of 60 cycles per second, and a manganese concentration of about $2 \times 10^{-2}$ gram atoms per mol of zinc sulfide results in white light at high operating frequencies of about 5000 cycles per second. These figures are of course approximate and the exact concentration of manganese may vary with details of the firing procedure and proportions and total quantities of materials; it will in general be between the limits of $0.75 \times 10^{-2}$ to $1.25 \times 10^{-2}$ gram atoms per mol of zinc sulfide at the low frequency end of the range and between $1.5 \times 10^{-2}$ to $2.5 \times 10^{-2}$ gram atoms at the high frequency end. As for the inbetween frequencies, since the designation "white" is, at least to a certain degree, subjective and admits of qualification as "warm," or "cool," or daylight," a linear interpolation between 60 cycles per second and 5000 cycles per second and the corresponding concentrations of manganese provides an adequate approximation for the required manganese concentration to give white emission. To put it differently, starting with $1 \times 10^{-2}$ gram atom Mn for 60 cycles per second, an increment in manganese of $2 \times 10^{-3}$ gram atom Mn should be added for each increment of 1000 cycles per second in frequency in order to provide white emission. This relationship is depicted in the graph of FIG. 1 wherein the shaded band shows the manganese concentration wherein white light will be found for operating frequencies up to 5000 cycles per second. The band represents a spread or tolerance of ±25% in manganese concentration related to variations in firing procedure and the various shades of white from warm to cool.

Where firing is in dry $H_2S$, the occurrence of orange self-coactivated copper centers shifts the spectrum balance towards the red. Therefore less yellow emitting centers from substitutional manganese are needed in order to achieve white light and the proportion of manganese is reduced roughly five-fold. In general the manganese concentration will be between the limits of $1.5 \times 10^{-3}$ to $2.5 \times 10^{-3}$ at low frequencies, that is frequencies in the nature of 60 cycles per second, and between the limits of $3 \times 10^{-3}$ to $5 \times 10^{-3}$ at high operating frequencies of about 5000 cycles per second. As for inbetween frequencies, a linear interpolation between the low and the high frequency end and the corresponding concentrations of manganese provides an adequate approximation. In other words starting with $2 \times 10^{-3}$ gram atoms of manganese for 60 cycles per second, an increment in manganese of about $4 \times 10^{-4}$ gram atoms per mol of zinc sulfide should be added for each increment of 1000 cycles per second in frequency. This relationship is depicted in the graph of FIG. 2 wherein the shaded band shows the manganese concentration for dry $H_2S$ firing wherein white light will be found for operating frequencies up to 5000 cycles per second. The band represents a spread or tolerance of ±25% in manganese concentration.

Three specific examples of suitable phosphor preparations in accordance with the invention are as follows:

EXAMPLE I

*60 Cycle Operation—Moist $H_2S$ Firing*

97.5 grams (1 mol) of zinc sulfide is slurried with 10 cc. of an aqueous solution of $Cu(NO_3)_2$ containing $2.5 \times 10^{-4}$ g.-atoms/cc. of Cu, 10 cc. of an aqueous solution of $Al(NO_3)_3$ containing $1 \times 10^{-5}$ g.-atoms/cc. of Al, 10 cc. of an aqueous solution of $Mn(NO_3)_2$ containing $1 \times 10^{-3}$ g.-atoms/cc. of Mn, and about 70 cc. of distilled water. (Proportions are 1 mol ZnS, $2.5 \times 10^{-3}$ g.-atoms Cu, $1 \times 10^{-4}$ g.-atoms Al, and $1 \times 10^{-2}$ g.-atoms Mn.) After thorough mixing the slurry is dried in an oven kept at about 120° C., and transferred to a bottle-shaped silica firing vessel. A thin quartz tube extending all the way into the bottle-shaped firing vessel is inserted and wet hydrogen sulfide is passed through it into the firing vessel. The hydrogen sulfide thus passes over the phosphor and is ignited as it emerges from the mouth of the firing vessel. The hydrogen sulfide is mixed with water vapor by bubbling it through water kept at room temperature.

The firing vessel, with hydrogen sulfide passing through it is then inserted into a furnace preheated to 1100° C. and kept there for 1 hour. After this period it is withdrawn and let cool to room temperature without forced cooling.

The phosphor is removed from the firing vessel, washed with an aqueous solution of sodium cyanide to remove excess surface copper sulfide, and rinsed with copious amounts of distilled water. The phosphor is dried and is then ready for use in electroluminescent cells.

Figure 3:
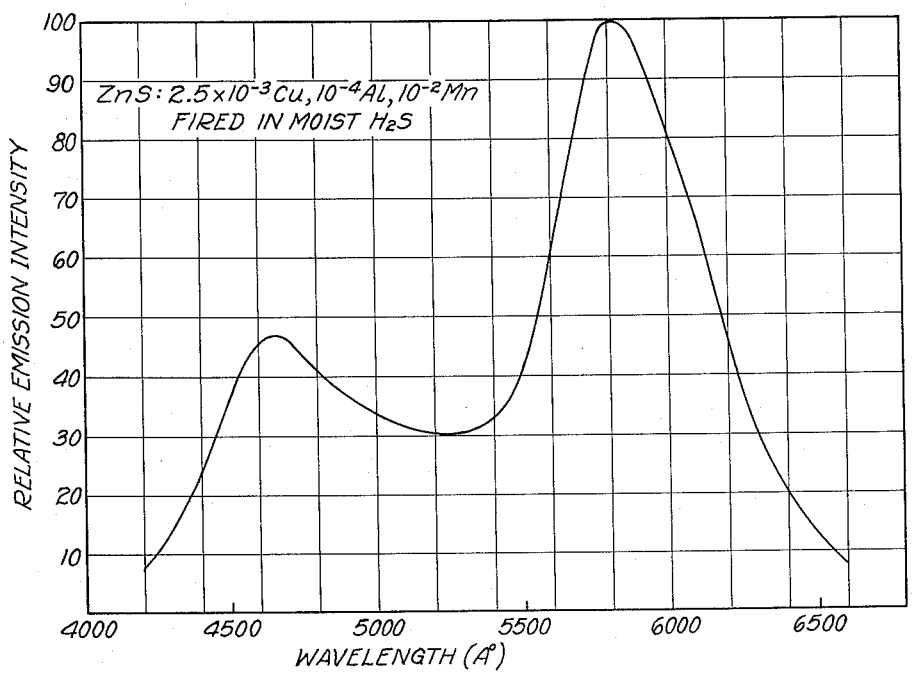
FIG. 3 illustrates a typical spectral response curve of a phosphor in accordance with the invention.

When tested at a field strength of about 30,000 volts/cm. (120 volts across a thickness of 1.5 mils) and frequencies of 60 to 500 c.p.s., the phosphor has an emission which looks white to the eye. Its electroluminescent emission spectrum is shown in FIGURE 3.

EXAMPLE II

*5000 Cycle Operation—Moist $H_2S$ Firing*

Identical in composition and preparation to Example I except that the manganese concentration is $2 \times 10^{-2}$ gram atoms of manganese per mol of zinc sulfide.

The phosphor when tested at about 30,000 volts per centimeter (120 volts across a 1.5 mil thick dispersion in dry chlorinated biphenyl) and 5000 cycles per second has an emission which looks white to the eye.

EXAMPLE III

*60 Cycle Operation—Dry $H_2S$ Firing*

97.5 grams (1 mol) of zinc sulfide is slurried with 10 cc. of an aqueous solution of $Cu(NO_3)_2$ containing $2.5 \times 10^{-4}$ g.-atoms/cc. of Cu, 10 cc. of an aqueous solution of $Al(NO_3)_3$ containing $1 \times 10^{-5}$ g.-atoms/cc. of Al, 10 cc. of an aqueous solution of $Mn(NO_3)_2$ containing $2 \times 10^{-4}$ g.-atoms/cc. of Mn, and about 70 cc. of distilled water. (Proportions are 1 mol ZnS, $2.5 \times 10^{-3}$ g.-atoms Cu, $1 \times 10^{-4}$ g.-atoms Al, $2 \times 10^{-3}$ g.-atoms Mn.) After thorough mixing the slurry is dried in an oven kept at about 120° C., and transferred to a bottle-shaped silica firing vessel. A thin quartz tube extending all the way into the bottle-shaped firing vessel is inserted and dry hydrogen sulfide is passed through it into the firing vessel. The hydrogen sulfide thus passes over the phosphor and is ignited as it emerges from the mouth of the firing vessel.

The firing vessel with hydrogen sulfide passing through it is then inserted into a furnace preheated to 1100° C., and kept there for 1 hour. After this period it is withdrawn and let cool to room temperature without forced cooling.

The phosphor is removed from the firing vessel, washed with an aqueous solution of sodium cyanide to remove excess surface copper sulfide and rinsed with copious amounts of distilled water.

When tested at a field strength of about 30,000 volts/cm. (120 volts across a thickness of 1.5 mils) and 60 c.p.s., the phosphor has an emission which looks white to the eye. Its electroluminescent emission spectrum is shown in FIGURE 3.

The specific examples of embodiments of the invention given herein are intended as illustrative and not as limitative of the invention whose scope is to be determined by the appended claims.

What I claim as new and desire to secure by Letters Patent of the United States:

1. A single component zinc sulfide electroluminescent phosphor activated by copper, aluminum and manganese and characterized by white emission at a selected frequency of excitation up to 5,000 cycles per second and constancy of color during life induced by firing in moist hydrogen sulfide at a temperature in the range of 1000 to 1200° C., a mixture of zinc sulfide including copper and aluminum salts to produce $8 \times 10^{-4}$ to $8 \times 10^{-3}$ gram atoms of Cu and $3.2 \times 10^{-5}$ to $3.2 \times 10^{-4}$ gram atoms of Al per mole of ZnS, and a concentration of manganese salts providing an atom concentration of Mn per mole of ZnS falling within the shaded band of of FIG. 1.

2. A single component zinc sulfide electroluminescent phosphor activated by copper, aluminum and manganese and characterized by white emission at a selected frequency of excitation up to 5,000 cycles per second and consistancy of color during life induced by firing in dry hydrogen sulfide at a temperature in the range of 1000 to 1200° C., a mixture of zinc sulfide including copper and aluminum salts to produce $8 \times 10^{-4}$ to $8 \times 10^{-3}$ gram atoms of Cu and $3.2 \times 10^{-5}$ to $3.2 \times 10^{-4}$ gram atoms of Al per mole of ZnS, and a concentration of manganese salts providing an atom concentration of Mn per mole of ZnS falling within the shaded band of FIG. 2.

3. The method of preparing a single component zinc sulfide electroluminescent phosphor activated by copper, aluminum and manganese and characterized by white emission at a selected frequency of excitation up to 5,000 cycles per second and constancy of color during life which comprises firing in moist hydrogen sulfide at a temperature in the range of 1000 to 1200° C., a mixture of zinc sulfide including copper and aluminum salts to produce $8 \times 10^{-4}$ to $8 \times 10^{-3}$ gram atoms of Cu and $3.2 \times 10^{-5}$ to $3.2 \times 10^{-4}$ gram atoms of Al per mole of ZnS, and a concentration of manganese salts providing an atom concentration of Mn per mole of ZnS falling within the shaded band of FIG. 1.

4. The method of preparing a single component zinc sulfide electroluminescent phosphor activated by copper, aluminum and manganese and characterized by white emission at a selected frequency of excitation up to 5,000 cycles per second and constancy of color during life which comprises firing in dry hydrogen sulfide at a temperature in the range of 1000 to 1200° C., a mixture of zinc sulfide including copper and aluminum salts to produce $8 \times 10^{-4}$ to $8 \times 10^{-3}$ gram atoms of Cu and $3.2 \times 10^{-5}$ to $3.2 \times 10^{-4}$ gram atoms of Al per mole of ZnS, and a concentration of manganese salts providing an atom concentration of Mn per mole of ZnS falling within the shaded band of FIG. 2.

5. The method of preparing a single component zinc sulfide electroluminescent phosphor activated by copper, aluminum and manganese and characterized by white emission at low frequencies in the nature of 60 cycles per second which comprises firing in moist hydrogen sulfide at a temperature of about 1100° C., a mixture of zinc sulfide including copper and aluminum nitrates to provide about $2.5 \times 10^{-3}$ gram atoms of copper and $1 \times 10^{-4}$ gram atoms of aluminum per mol of zinc sulfide and a concentration of manganese nitrate giving about $1 \times 10^{-2}$ gram atoms of manganese per mol of zinc sulfide.

6. The method of preparing a single component zinc sulfide electroluminescent phosphor activated by copper, aluminum and manganese and characterized by white emission at frequencies of about 5000 cycles per second and constancy of color during life which comprises firing in moist hydrogen sulfide at a temperature of about 1100° C., a mixture of zinc sulfide including copper and aluminum nitrates to provide about $2.5 \times 10^{-3}$ gram atoms of copper and $1 \times 10^{-4}$ gram atoms of aluminum per mol of zinc sulfide and a concentration of manganese nitrate giving about $2 \times 10^{-2}$ gram atoms of manganese per mol of zinc sulfide.

7. The method of preparing a single component zinc sulfide electroluminescent phosphor activated by copper, aluminum and maganese and characterized by white emission at low frequencies in the nature of 60 cycles per second and constancy of color during life, which comprises firing in dry hydrogen sulfide at a temperature of about 1100° C., a mixture of zinc sulfide including copper and aluminum nitrates to provide about $2.5 \times 10^{-3}$ gram atoms of copper and $1 \times 10^{-4}$ gram atoms of aluminum per mol of zinc sulfide and a concentration of manganese nitrate giving about $2 \times 10^{-3}$ gram atoms of manganese per mol of zinc sulfide.

References Cited in the file of this patent

UNITED STATES PATENTS

| | | |
|---|---|---|
| 2,743,237 | Froelich | Apr. 24, 1956 |
| 2,743,238 | Hunt et al. | Apr. 24, 1956 |
| 2,782,168 | Fetters | Feb. 19, 1957 |

FOREIGN PATENTS

| | | |
|---|---|---|
| 526,181 | Belgium | Aug. 2, 1954 |